(12) United States Patent
Teixeira

(10) Patent No.: US 10,399,624 B2
(45) Date of Patent: Sep. 3, 2019

(54) BICYCLE SEAT POST WITH TWO-WAY, SPRING-ASSIST HEIGHT ADJUSTMENT

(71) Applicant: Specialized Bicycle Components, Inc., Morgan Hill, CA (US)

(72) Inventor: Chuck Teixeira, Santa Cruz, CA (US)

(73) Assignee: SPECIALIZED BICYCLE COMPONENTS, INC., Morgan Hill, CA (US)

( * ) Notice: Subject to any disclaimer, the term of this patent is extended or adjusted under 35 U.S.C. 154(b) by 0 days.

(21) Appl. No.: 15/787,271

(22) Filed: Oct. 18, 2017

(65) Prior Publication Data
US 2019/0111985 A1    Apr. 18, 2019

(51) Int. Cl.
| B62J 1/08 | (2006.01) |
| B62J 1/06 | (2006.01) |
| F03G 1/10 | (2006.01) |

(52) U.S. Cl.
CPC . B62J 1/06 (2013.01); B62J 1/08 (2013.01); B62J 2001/085 (2013.01); F03G 1/10 (2013.01)

(58) Field of Classification Search
CPC ..... Y10T 403/32516; Y10T 403/32467; Y10T 403/32501; F16B 7/1427; F16B 7/1463; B62K 21/24; B62K 19/36; B62J 1/00; B62J 1/06; B62J 1/08; A47C 3/20; A47C 3/285
See application file for complete search history.

(56) References Cited

U.S. PATENT DOCUMENTS

| 4,563,939 A | 1/1986 | Siegrist |
| 4,951,552 A | 8/1990 | Fox |
| 5,324,058 A | 6/1994 | Massaro |
| 5,366,275 A | 11/1994 | Sulzer |
| 5,429,217 A | 7/1995 | Stringer et al. |
| 5,431,085 A | 7/1995 | Geffray |
| 6,050,585 A | 4/2000 | Rai |
| 6,159,119 A | 12/2000 | Nakamura et al. |

(Continued)

FOREIGN PATENT DOCUMENTS

| FR | 2702809 A1 | 9/1994 |
| JP | 2005231567 A | 9/2005 |
| JP | 2005262900 A | 9/2005 |

OTHER PUBLICATIONS

U.S. Appl. No. 15/403,920, filed Jan. 11, 2017, by Bowers et al.

(Continued)

*Primary Examiner* — Daniel J Wiley
(74) *Attorney, Agent, or Firm* — Michael Best & Friedrich LLP

(57) ABSTRACT

A bicycle is disclosed as having a seat and a seat post assembly supported supporting the seat. The seat post assembly includes a lower seat support, an upper seat support secured to the seat and movable (e.g., telescopically) relative to the lower seat support, a locking mechanism for selectively locking and unlocking the upper seat support relative to the lower seat support, and an actuating mechanism to facilitate moving the upper seat support relative to the lower seat support. The actuating mechanism comprises a spring having first and second nodes, and a drive system adapted drive the second node while the first node is engaged with the upper seat support to energize the spring. In one embodiment, the drive system comprises a reciprocating driver constructed to drive either one of the first node and the second node. Preferably, the reciprocating driver is driven by a unidirectional rotor.

18 Claims, 20 Drawing Sheets

(56) References Cited

U.S. PATENT DOCUMENTS

| | | |
|---|---|---|
| 7,422,224 B2 | 9/2008 | Sicz et al. |
| 8,016,349 B2 | 9/2011 | Mouri et al. |
| 8,038,208 B2 | 10/2011 | Mankadi |
| 8,056,309 B2 | 11/2011 | Vandendriessche |
| 8,246,065 B1 | 8/2012 | Kodama et al. |
| 8,317,261 B2 | 11/2012 | Walsh |
| 8,550,551 B2 | 10/2013 | Shirai |
| 8,752,893 B2 | 6/2014 | Chien et al. |
| 8,814,109 B2 | 8/2014 | Laird et al. |
| 8,833,786 B2 | 9/2014 | Camp et al. |
| 8,833,848 B2 | 9/2014 | Shirai |
| 9,242,688 B2 | 1/2016 | McAndrews et al. |
| 9,272,745 B2 | 3/2016 | Camp et al. |
| 9,415,824 B2 | 8/2016 | Maier |
| 2004/0079224 A1 | 4/2004 | Bernhardt et al. |
| 2006/0175792 A1 | 8/2006 | Sicz et al. |
| 2008/0127770 A1 | 6/2008 | Morelli |
| 2012/0006949 A1 | 1/2012 | Laird et al. |
| 2012/0180470 A1 | 7/2012 | Schroeder et al. |
| 2012/0228906 A1 | 9/2012 | McAndrews et al. |
| 2015/0034779 A1 | 2/2015 | McAndrews et al. |
| 2016/0304146 A1 | 10/2016 | Teixeira et al. |
| 2018/0194418 A1 | 7/2018 | Bowers |

OTHER PUBLICATIONS

U.S. Appl. No. 15/097,667, filed Apr. 13, 2016, by Teixeira et al.
CutleryLover, "Explaining How OTF Automatic Knives Work (OTF = Out the Front)," <https://www.youtube.com/watch?v=8dtJkpgn6SU&t=31s> published Jul. 31, 2016.
Mechanisms, "Reciprocate Gear," <https://www.youtube.com/watch?v=Sk8oqLw12Tw> published Apr. 24, 2018.
European Patent Office Action for Application No. 17208135.8 dated May 3, 2018 (6 pages).

BICYCLE SEAT POST WITH TWO-WAY, SPRING-ASSIST HEIGHT ADJUSTMENT

BACKGROUND

The present invention relates to bicycle seat posts having adjustable heights.

Most bicycles include a seat post for supporting the seat above the frame. Seat posts are commonly inserted into the seat tube of the bicycle frame and secured in place by a binder bolt. The height of the seat can be adjusted to accommodate riders of various sizes by loosening the binder bolt, sliding the seat post relative to the seat tube, and re-tightening the binder bolt. It can be appreciated that this adjustment to the seat height must be done with the bicycle in a stationary position, with the rider off the bicycle.

In certain situations, it is desirable to adjust the height of a seat while the bicycle is being ridden. For example, in certain off-road riding situations, it is beneficial to lower the seat in order to lower the center of gravity of the rider. This is often advantageous when riding the bicycle at high speeds (e.g., downhill) over bumpy terrain. After the downhill bumpy terrain, it is often desirable to raise the seat back to its original position so that the rider can comfortably sit on the seat and efficiently pedal the bicycle.

In order to satisfy the need for adjusting the seat height while riding, it is known to provide seats that can be adjusted on the fly. For example, it is known to make the seat post from two telescoping members that are coupled by a threaded rod driven by an electric motor. The position of the seat can be adjusted by actuating the motor and turning the threaded rod. Such a system is disclosed in U.S. Pat. No. 6,050,585. Alternatively, it is known to bias the telescoping tubes to an extended position by a spring (e.g., a mechanical or air spring). A locking mechanism (e.g., a hydraulic lock) can be used to selectively secure the height of the seat at the desired position.

SUMMARY

The present invention provides a bicycle comprising front and rear wheels, a frame supported by the front and rear wheels, a seat, and a seat post assembly supported by the frame and supporting the seat. The seat post assembly includes a lower seat support secured to the frame, an upper seat support secured to the seat and movable (e.g., telescopically) relative to the lower seat support, a locking mechanism (e.g., a pawl and notch) for selectively locking and unlocking the position of the upper seat support relative to the lower seat support, and an actuating mechanism to facilitate moving the upper seat support relative to the lower seat support. The actuating mechanism comprises a spring (e.g., a coil spring) having a first node and a second node, and a drive system secured to the lower seat support and adapted drive the second node while the first node is engaged with the upper seat support to energize the spring. Preferably, each node of the spring is secured to a corresponding follower, and each follower is engageable with a corresponding stop on the upper seat support to facilitate transfer of force from the spring to the upper seat support via the follower and the stop.

In one embodiment, the drive system comprises a reciprocating driver movable from a neutral position in upward and downward directions. For example, the reciprocating driver can be constructed to drive either one of the first node and the second node. Preferably, the reciprocating driver is driven by a unidirectional rotor (e.g., including a one-way clutch). If desired, the drive system can include a lock release that is engageable with the locking mechanism to unlock the locking mechanism.

Certain concepts of the present invention are also present in a method of adjusting a height of a bicycle seat assembly like the one described above. The method comprises locking the upper seat support in the lowered position relative to the lower seat support, engaging the first node to the upper seat support, moving the second node upward relative to the first node to energize the spring, and unlocking the upper seat support from the lower seat support, resulting in energy release from the spring and upward movement of the seat. Preferably, the bicycle seat assembly further includes a pawl pivotally coupled to the lower seat support and a notch coupled to the upper seat support, and the step of locking includes inserting the pawl into the notch, and the step of unlocking includes removing the pawl from the notch.

In one embodiment, the bicycle seat assembly further includes a drive system secured to the lower seat support, and the step of moving the second node includes engaging the drive system with the second node and moving the drive system upward. Preferably, the drive system comprises a reciprocating driver and a unidirectional rotor coupled to the reciprocating drive, and the step of moving the drive system upward includes rotating the rotor.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
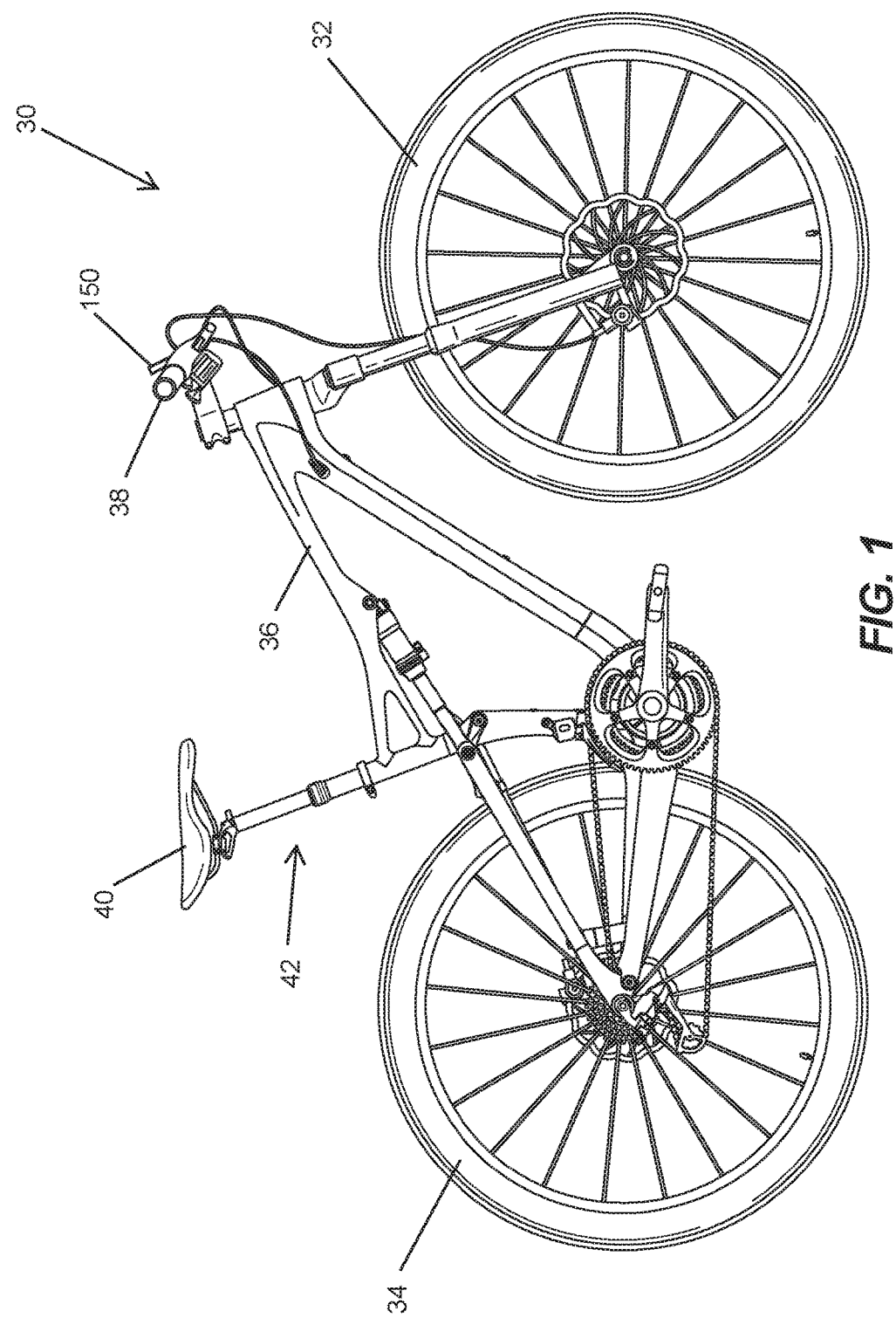
FIG. 1 is a side view of a bicycle having a seat post assembly embodying the present invention.
Figure 2:
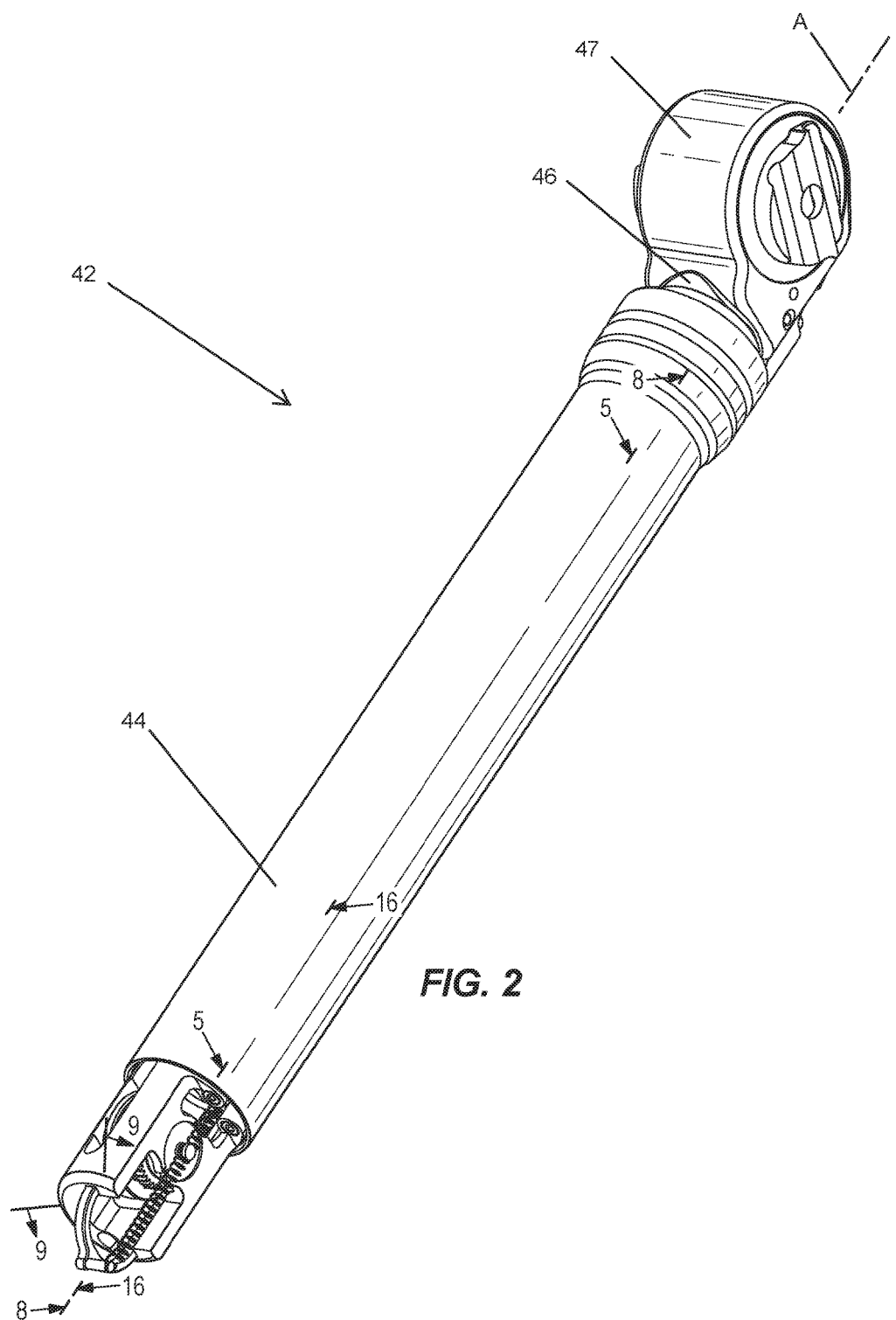
FIG. 2 is a perspective view of the seat post assembly of FIG. 1.
Figure 3:
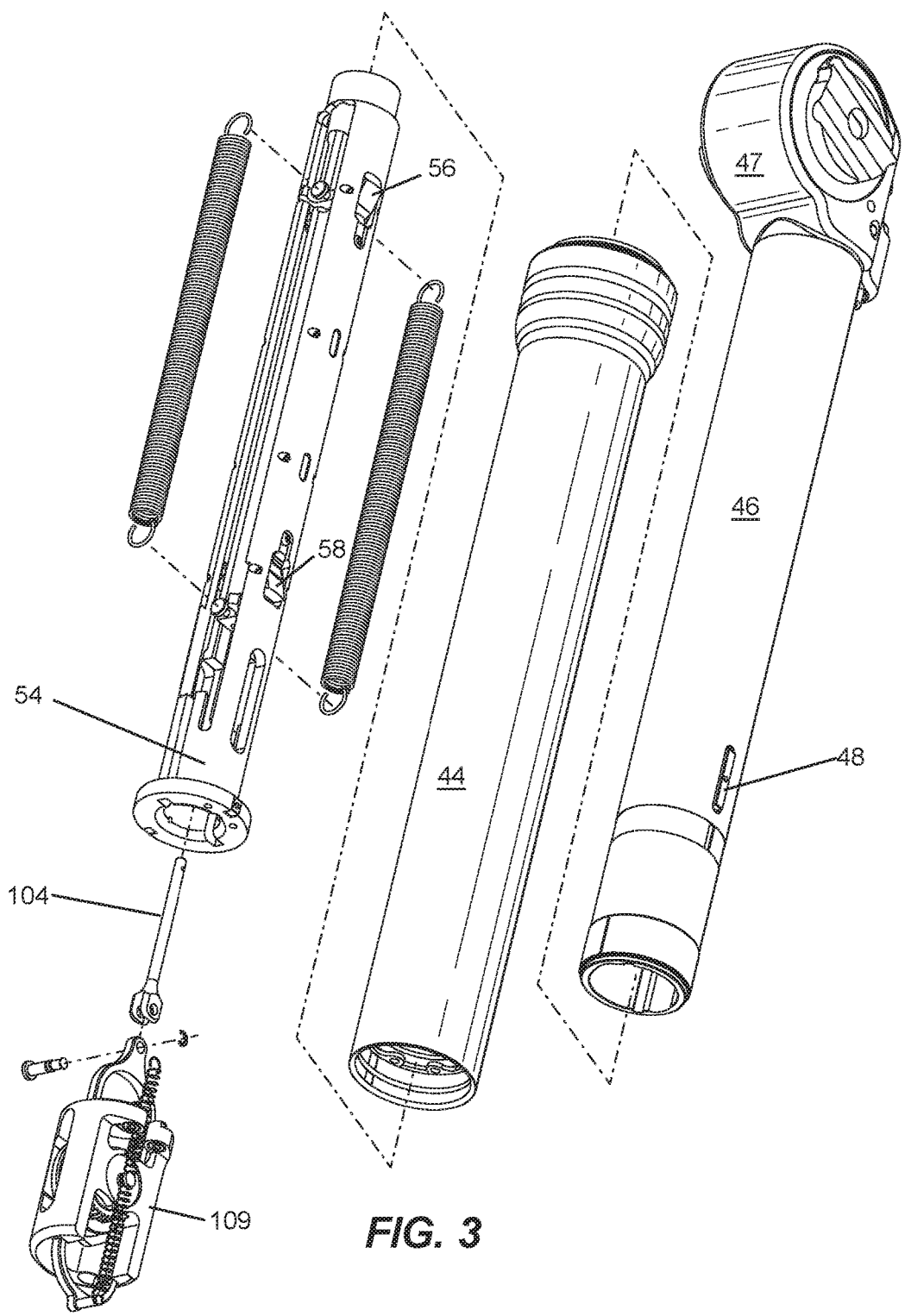
FIG. 3 is a partially exploded view of the seat post assembly of FIG. 2.
Figure 4:
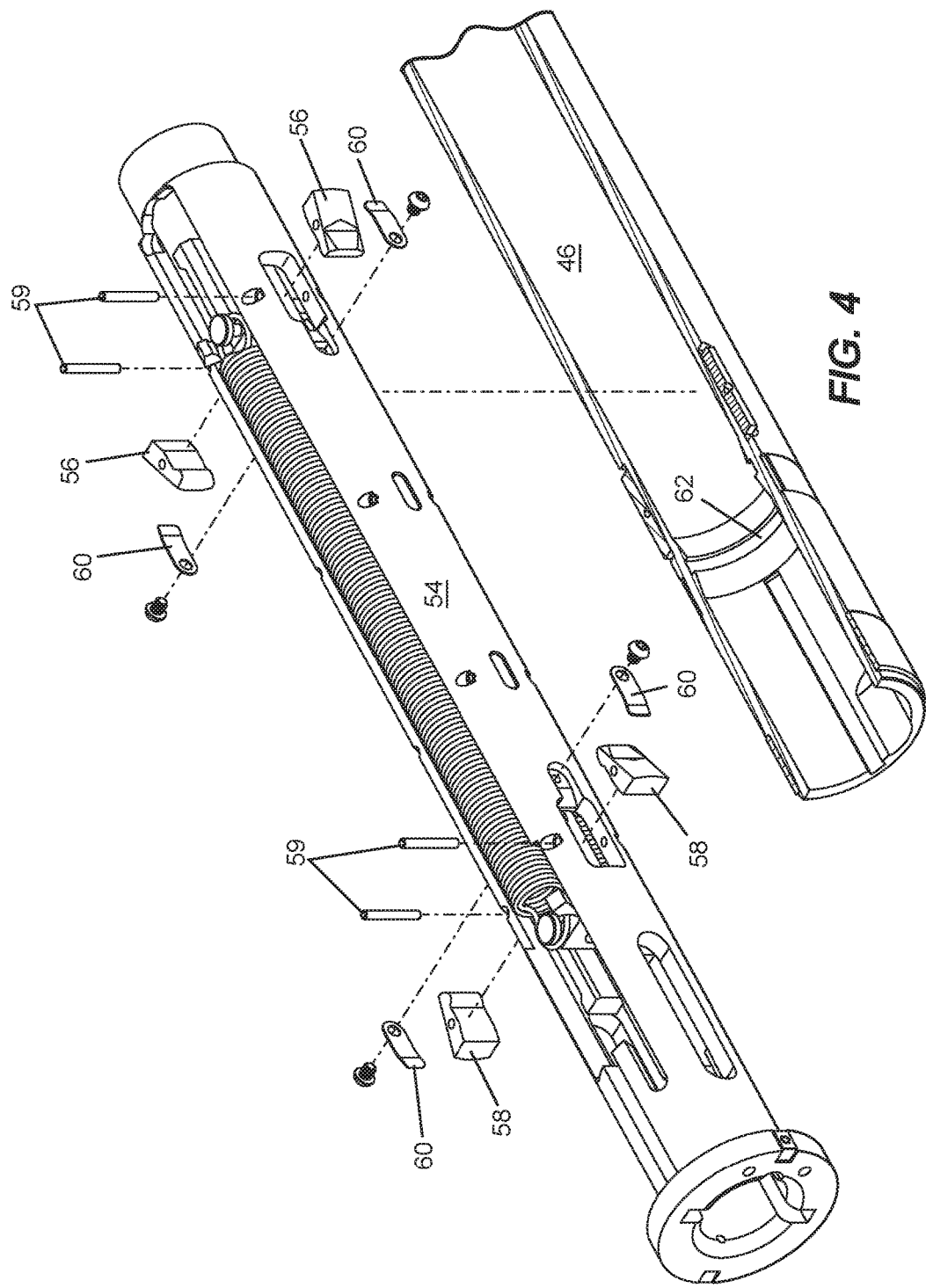
FIG. 4 is a partially exploded view of a locking mechanism from the seat post assembly of FIG. 2.

FIG. 1 illustrates a bicycle 30 having a front wheel 32, a rear wheel 34, a frame 36 supported by the front and rear wheels, handlebars 38 for steering the bicycle, a seat 40 for supporting the rider, and a seat post assembly 42 supporting the seat above the frame. The illustrated seat post assembly 42 includes a lower seat support in the form of a lower tube 44 secured to the frame, and an upper seat support in the form of an upper tube 46 secured to the seat. The upper tube 46 supports a clamp 47 for securing to the seat 40, as is known in the art. The upper tube 46 is telescopically movable relative to the lower tube 44 along an axis A between a lowered position and a raised position. Referring to FIG. 3, a pair of outer keys 48 secured to the upper tube 46 slide within a pair of corresponding outer keyways (not shown) formed on an interior surface of the lower tube 44 in order to prevent rotation of the upper tube 46 relative to the lower tube 44.

The seat post assembly 42 further includes a locking mechanism for locking and unlocking the position of the upper tube 46 relative to the lower tube 44. The locking mechanism includes a fixed support 54 fixedly secured to a lower end of the lower tube 44. The fixed support 54 pivotally supports a pair of upper pawls 56 and a pair of lower pawls 58. Each pawl pivots on a pawl shaft 59 and is biased from a retracted position to an extended position by a corresponding return spring 60. In the extended position, each pawl is positioned to engage a notch 62 on the inner surface of the upper tube 46. In the illustrated embodiment, the notch 62 is formed by a circumferential groove on the inner surface of the upper tube 46. It should be understood that, instead of a single groove, multiple notches could be provided to engage the multiple pawls.

Figure 5:
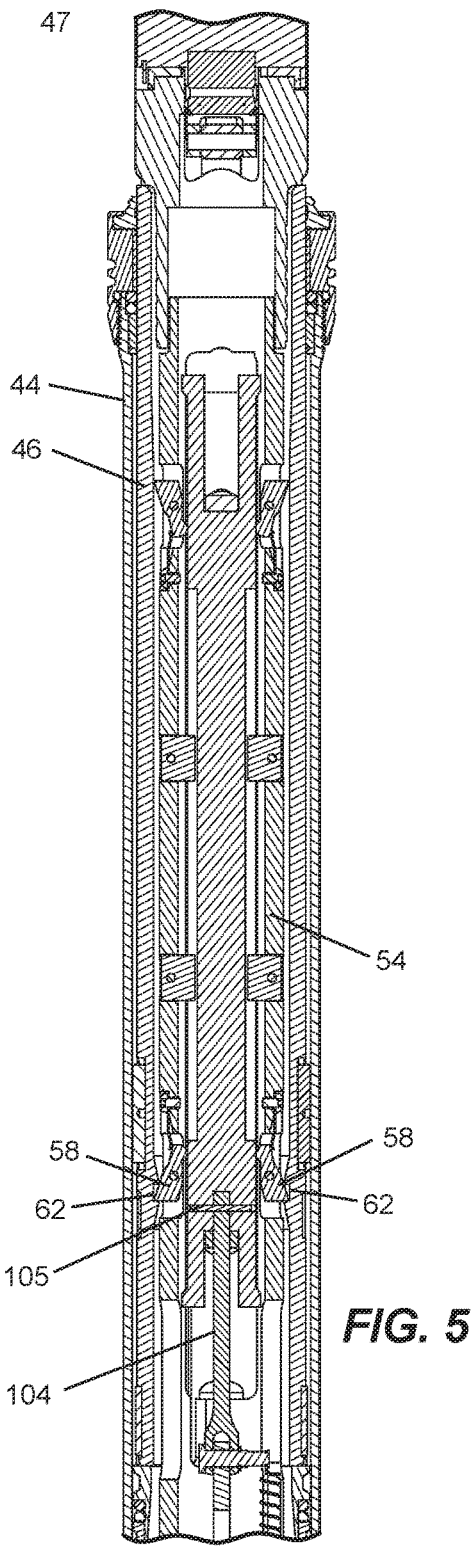
FIG. 5 is a section view of the locking assembly taken along line 5-5 in FIG. 2 with the seat post assembly in a lowered position.
Figure 6:
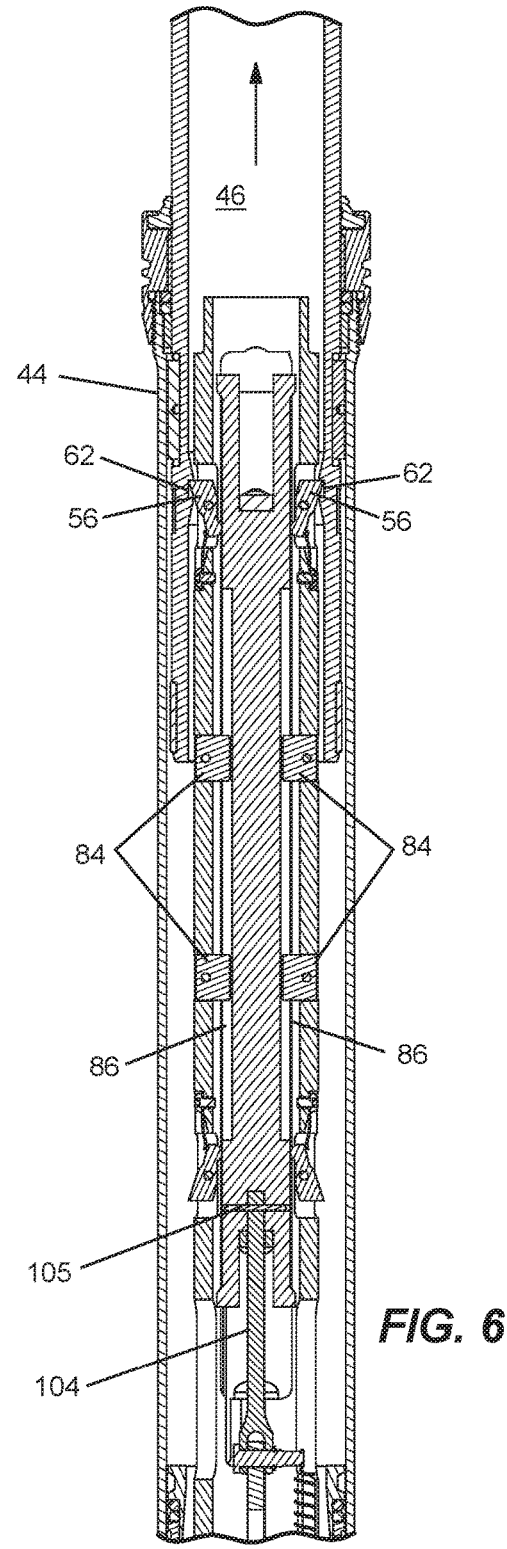
FIG. 6 is the view of FIG. 5 with the seat post assembly in a raised position.

In operation, the locking mechanism can be used to selectively lock the upper tube 46 in either the raised or lowered position. In the lowered position (see FIG. 5), the lower pawls 58 engage the notch 62 to limit upward movement of the upper tube 46 relative to the lower tube 44. In order to move the upper tube 46 upward, the lower pawls 58 must be pivoted to their corresponding retracted positions (as described below in more detail), which then allows the upper tube 46 to move upward toward the raised position. When the upper tube 46 reaches the raised position, the upper pawls 56 will engage the notch 62 to lock the upper tube 46 in the raised position (FIG. 6). In order to move the upper tube 46 downward, the upper pawls 56 must be pivoted to their corresponding retracted positions (as described below in more detail), which then allows the upper tube 46 to move downward toward the lowered position. When the upper tube 46 reaches the lowered position, the lower pawls 58 will engage the notch 62 to lock the upper tube 46 in the lowered position (FIG. 5).

The seat post assembly 42 further includes an actuating mechanism that provides power for moving the upper tube 46 and also provides a release for unlocking the locking mechanism. The actuating mechanism includes a spring system for providing stored energy and a drive system 100 for providing motion to the actuating mechanism.

The illustrated spring system includes two tension springs 72 having upper ends that are secured to buttons 73 on an upper follower 74 and lower ends that are secured to buttons 73 on a lower follower 76. Each follower can slide axially relative to the upper tube 46 up to a certain point. Specifically, the upper follower 74 can move downward relative to the upper tube 46 until it contacts an upper stop formed by two pins 78 positioned through the upper tube 46, and the lower follower 76 can move upward relative to the upper tube 46 until it contacts a lower stop formed by an end of a slot 80 in which the lower follower 76 slides.

Figure 7:
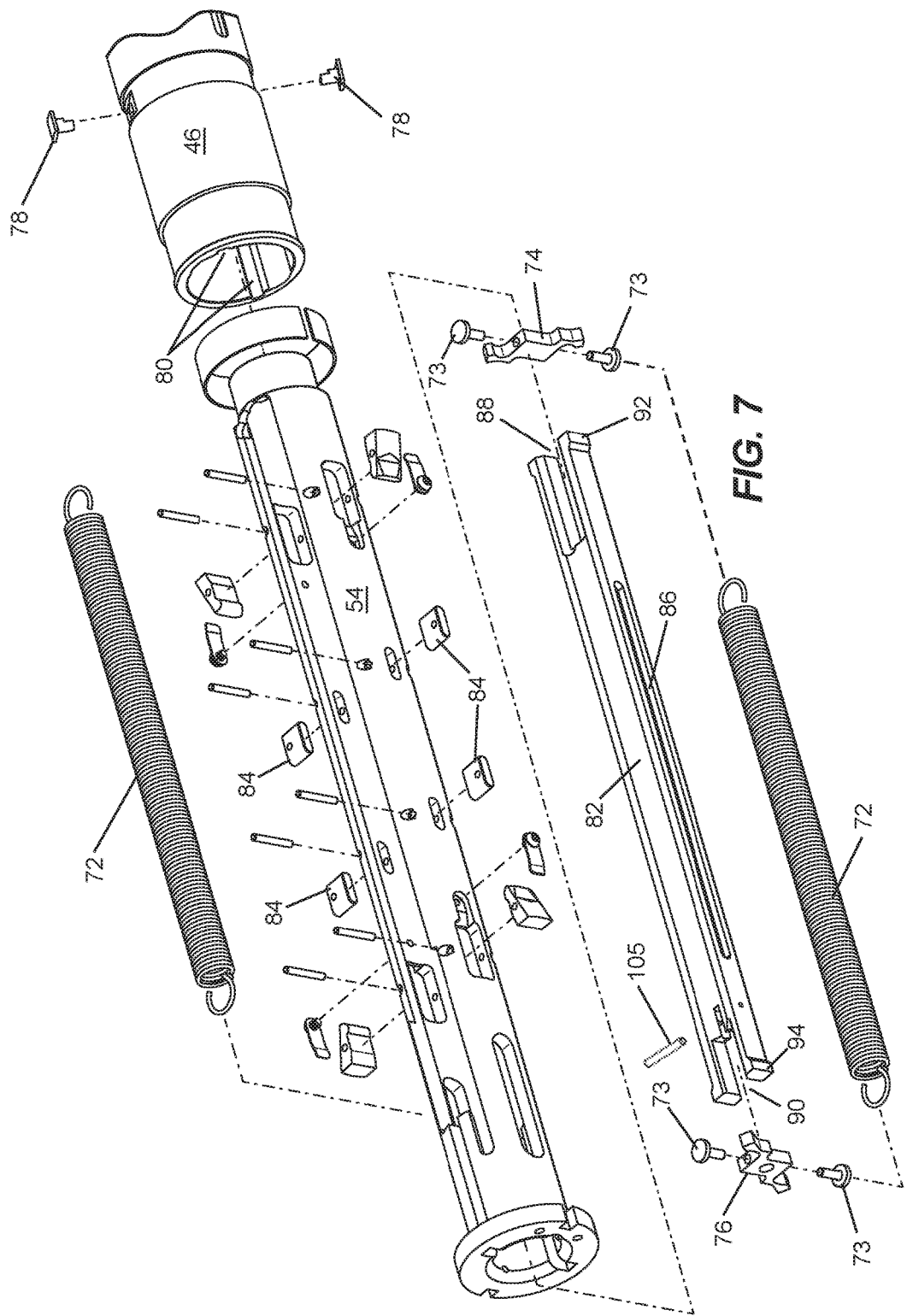
FIG. 7 is an exploded view of a spring system from the seat post assembly of FIG. 2.

Movement of the followers is also limited by an actuating member 82 positioned between the followers. Referring to FIGS. 5-7, the actuating member 82 is mounted for sliding movement inside the fixed support 54. Two pairs of inner keys 84 extend radially inward from the fixed support 54 to engage inner keyways 86 in the actuating member 82, thereby limiting rotation of the actuating member 82 relative to the fixed support 54. The ends of the actuating member 82 include upper and lower slots 88,90 dimensioned to receive the upper and lower followers 74,76, as shown in FIG. 7. In its neutral position, the followers are each positioned in the corresponding slot 88,90 of the actuating member 82 and are held in that position by the tension springs 72.

The upper and lower ends of the actuating member 82 also include a pair of opposed upper and lower release cams 92,94, respectively. The upper and lower release cams 92,94 are positioned to engage the upper and lower pawls 56,58 when the actuating member 82 travels a sufficient distance in the upward and downward directions, respectively. When the pawls 56,58 are engaged by the corresponding release cams, the pawls 56,58 are moved to the retracted position, thereby releasing the upper tube 46 from the lower tube 44.

Figure 9:
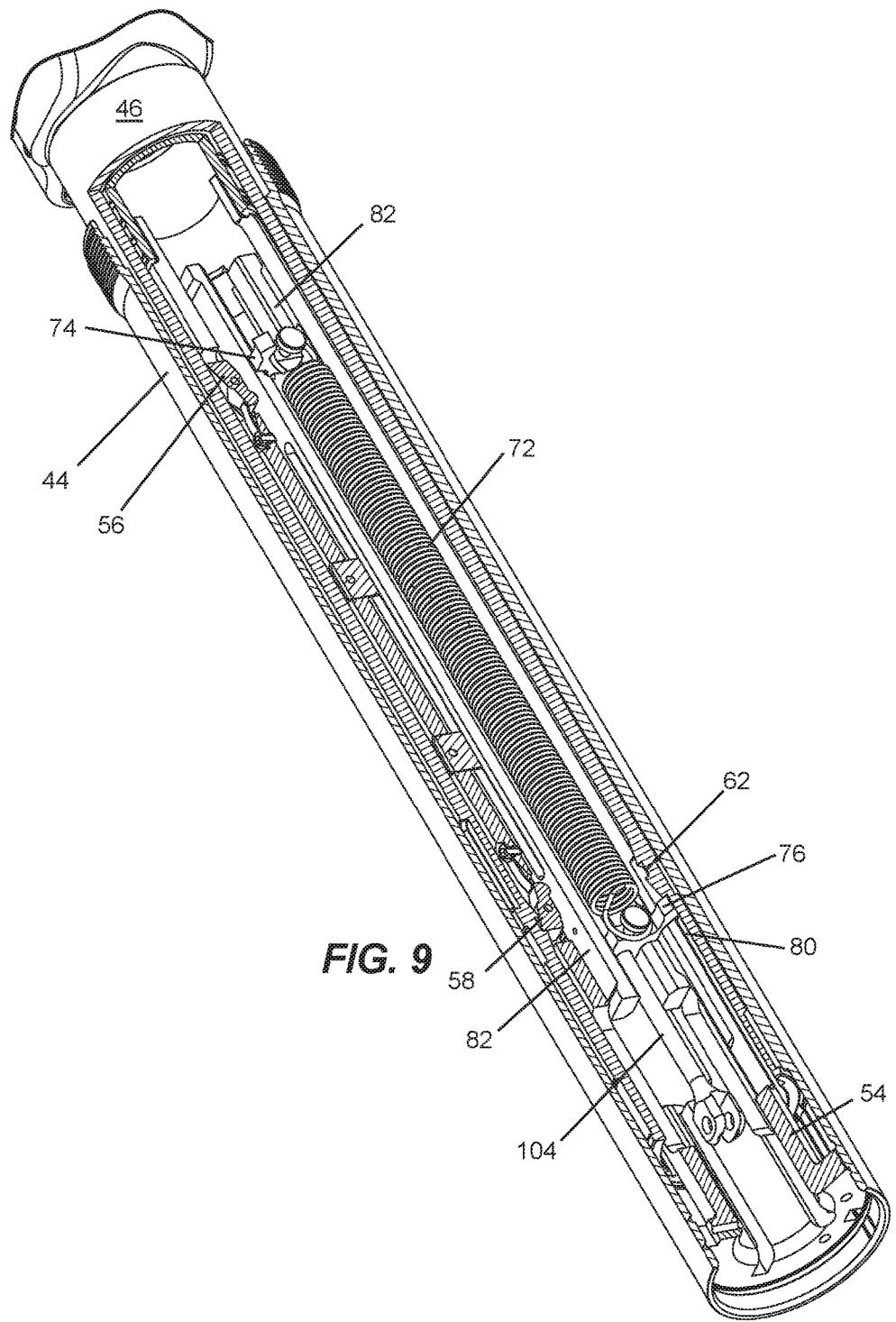
FIG. 9 is a section view taken along line 9-9 of FIG. 2 showing the spring system in a neutral position and the seat post assembly in the lowered position.
Figure 10:
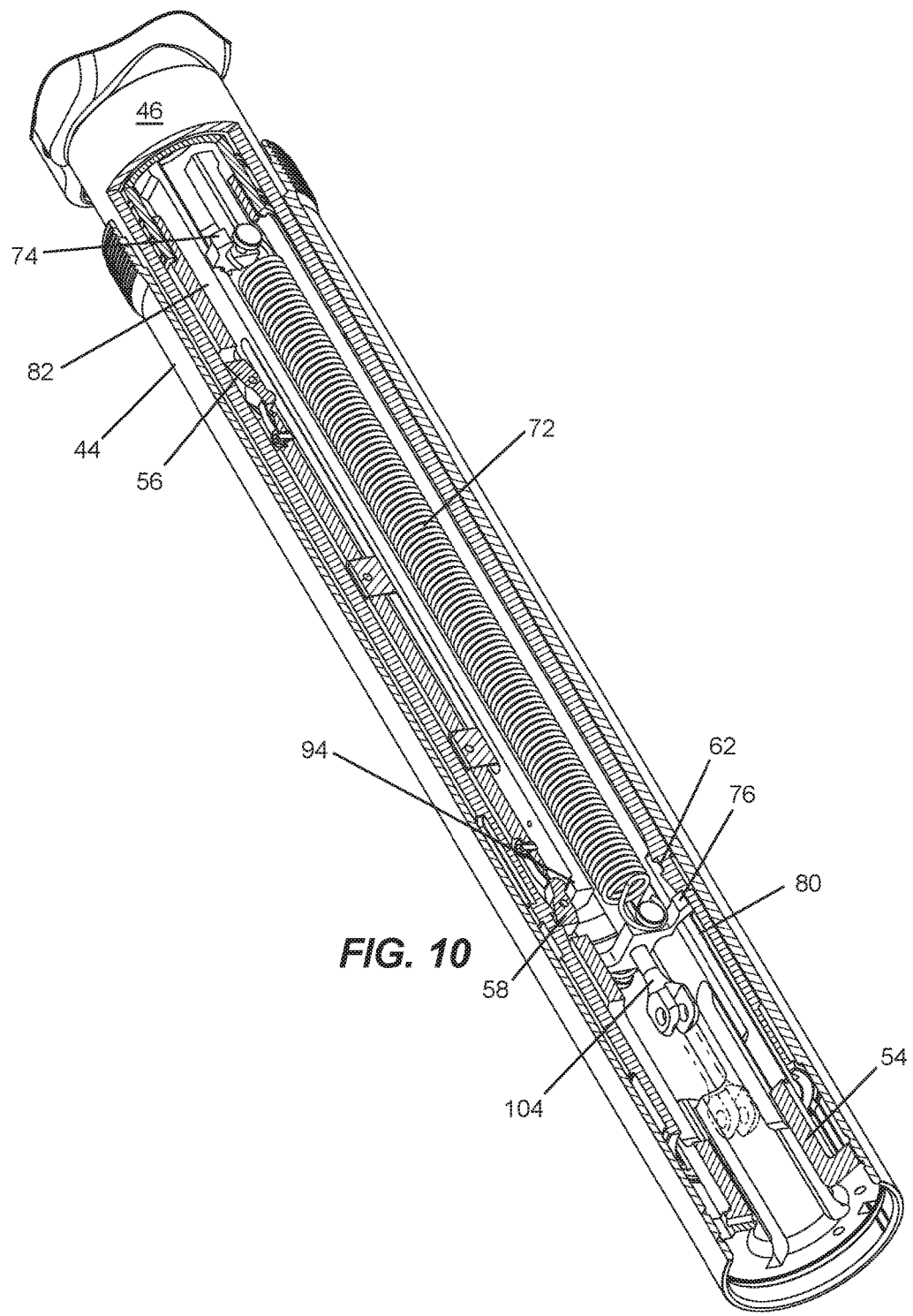
FIG. 10 is the section view of FIG. 9 with the spring system in an energize up position and the seat post assembly held in the lowered position.
Figure 11:
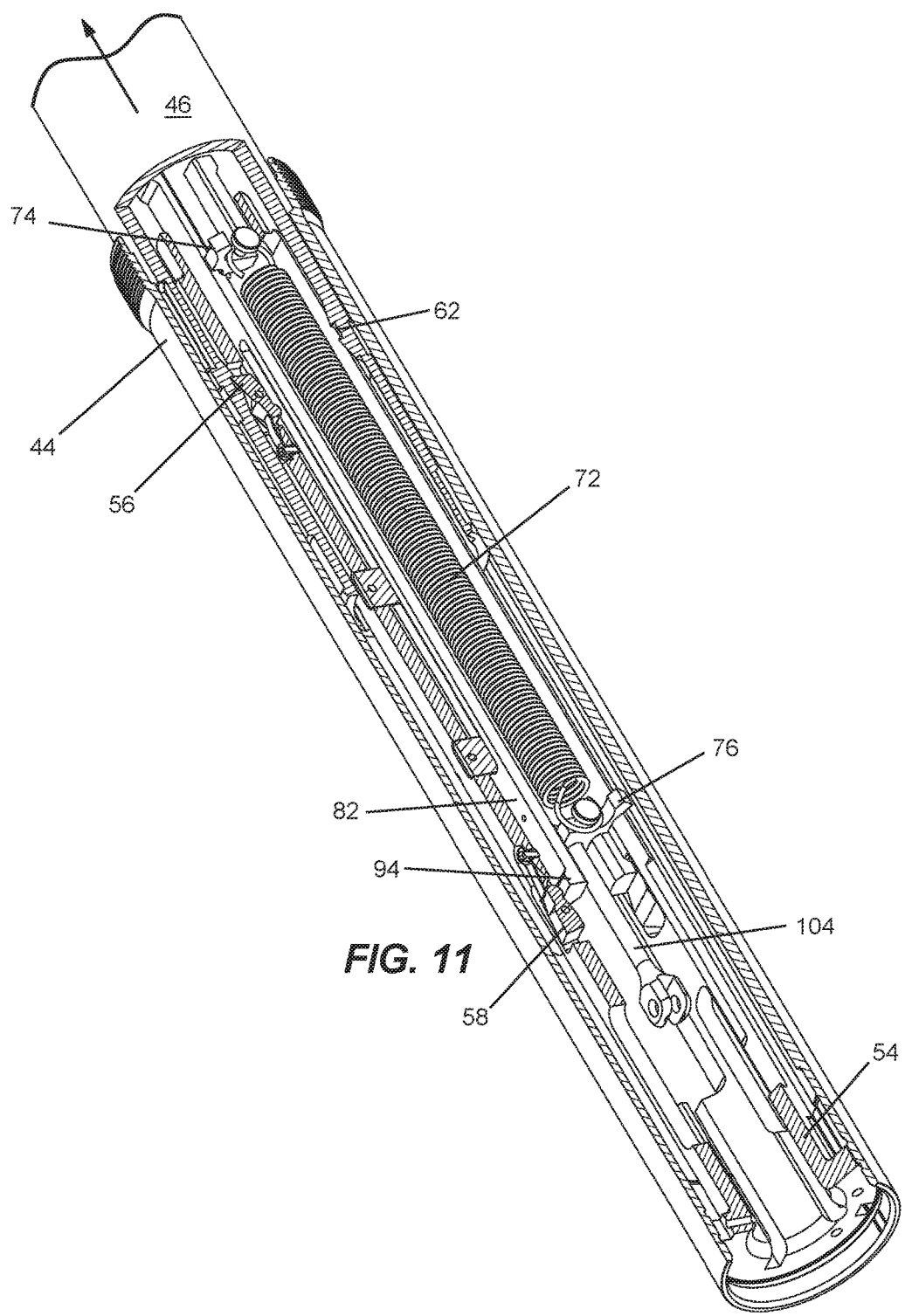
FIG. 11 is the section view of FIG. 10 with seat post assembly in the raised position immediately after triggering.

Referring to FIG. 9, when the upper tube 46 is locked in the lowered position, the lower follower 76 is positioned adjacent the lower stop (i.e., the end of the slot 80). If the actuating member 82 is then moved upward relative to the upper tube 46, it can be seen that the upper follower 74 moves upward while the lower follower 76 is help in place by the end of the slot 80, thereby energizing the tension springs 72 into tension (FIG. 10). The upper tube 46 is held in place by engagement of the lower pawls 58 in the notch 62. Eventually, the lower release cams 94 will contact the lower pawls 58 to unlock the upper tube 46. The spring tension will then act through the lower follower 76 to force the upper tube 46 to the raised position. This force is sufficient to lift and launch the upper tube 46 upward until the upper pawls 56 engage the notch 62 to lock the upper tube 46 in the raised position (FIG. 11).

Figure 12:
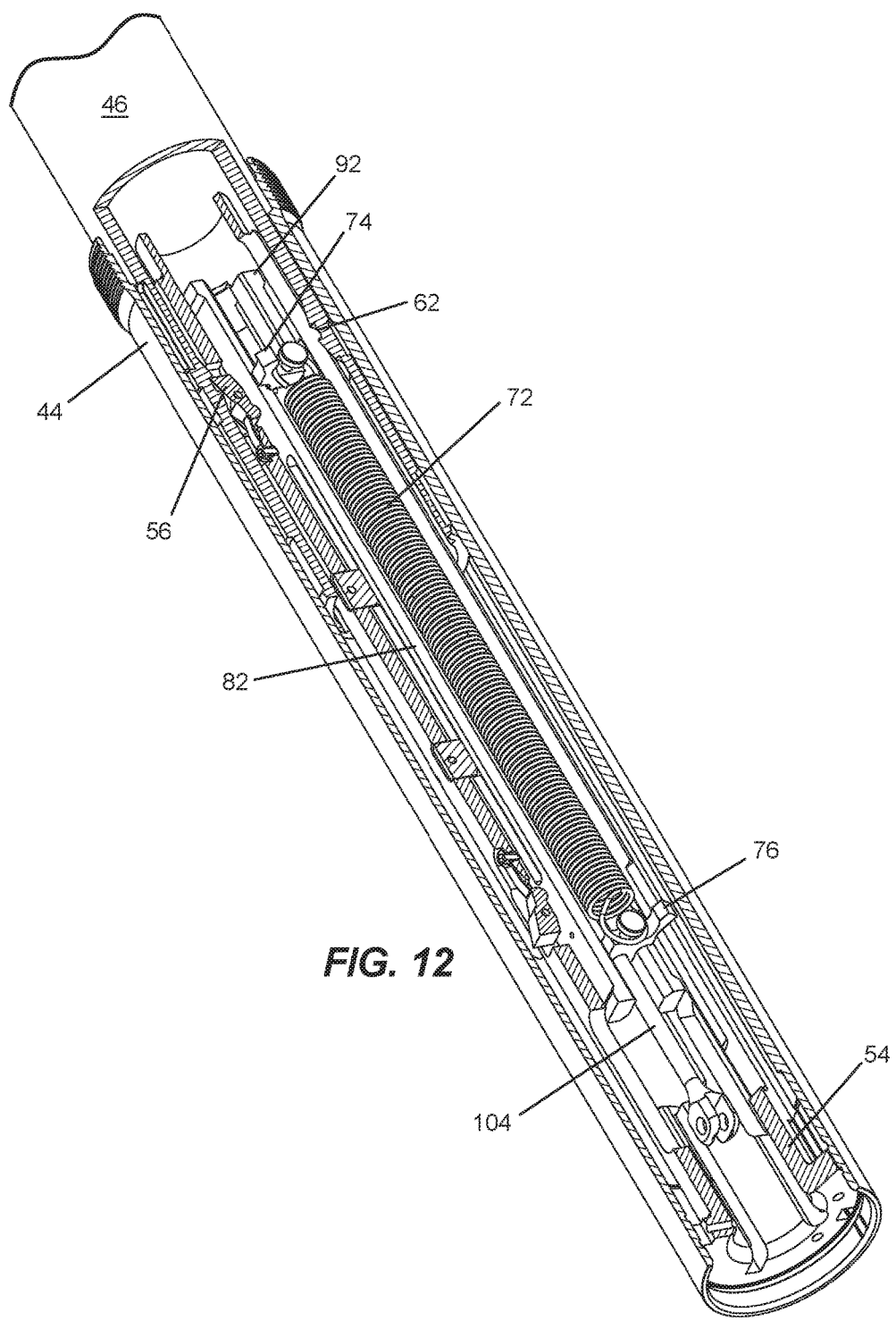
FIG. 12 is the section view of FIG. 11 with the spring system reset to a neutral position
Figure 13:
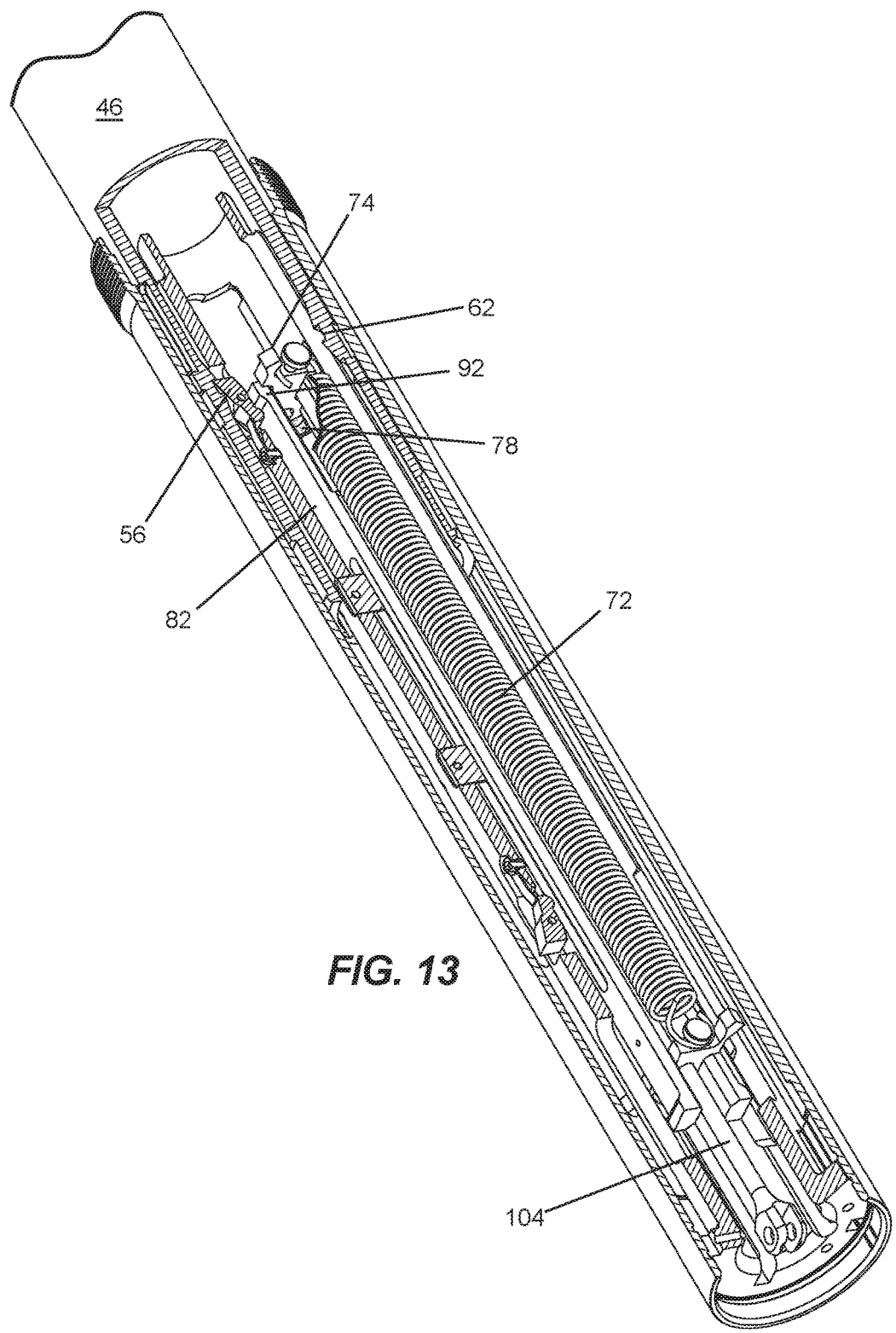
FIG. 13 is the section view of FIG. 12, with the spring system in an energize down position and the seat post assembly held in the raised position.
Figure 14:
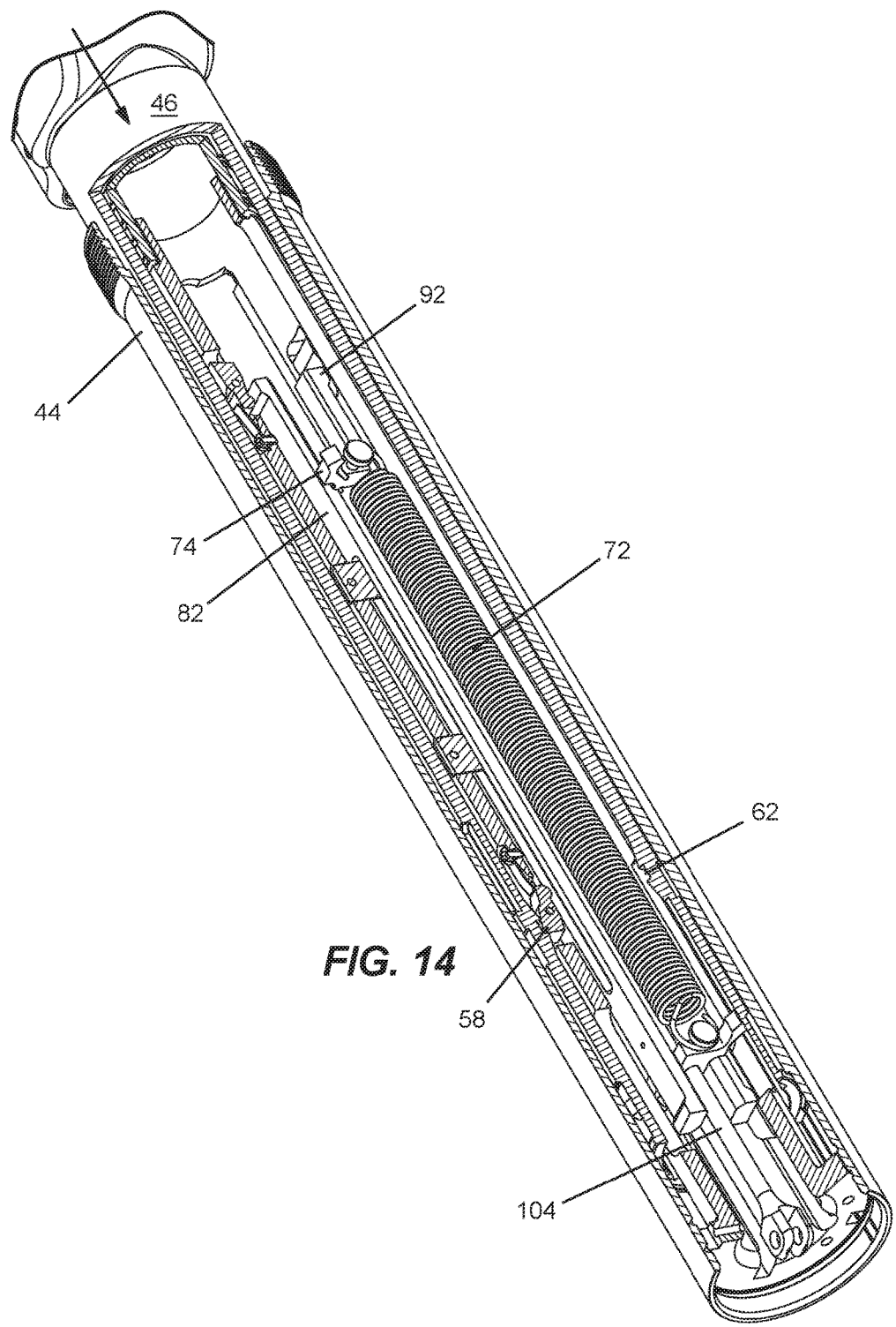
FIG. 14 is the perspective view of FIG. 13 with seat post assembly in the lowered position immediately after triggering.

After the upper tube 46 is locked in the raised position (FIG. 11), the actuating member 82 will move back to its neutral position with the upper follower 74 positioned adjacent the pins 78 (FIG. 12). Such movement of the actuating member 82 back to the neutral position is accomplished by the drive system 100, as described below in more detail. Further downward movement of the actuating member 82 relative to the upper tube 46 causes the lower follower 76 to move downward while the upper follower 74 is held in place by the pin 78, thereby energizing the tension springs 72 into tension (FIG. 13). The upper tube 46 is held in place by engagement of the upper pawls 56 in the notch 62. Eventually, the upper release cams 92 will contact the upper pawls 56 to unlock the upper tube 46. The spring tension will then act through the upper follower 74 to launch the upper tube 46 toward the lowered position where the lower pawls 58 will engage the notch 62 to lock the upper tube 46 in the lowered position (FIG. 14).

Figure 8:
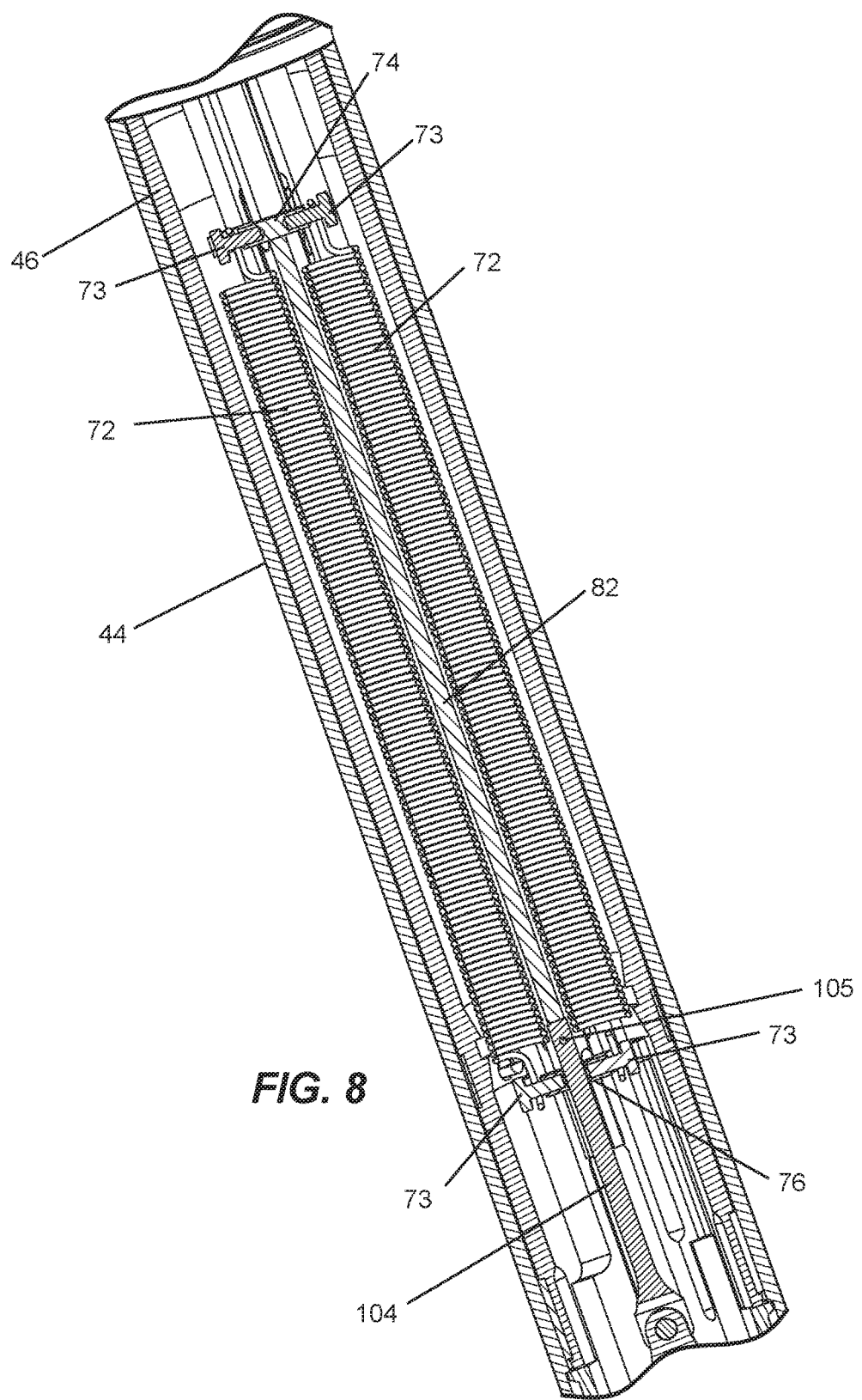
FIG. 8 is a section view of the spring system taken along line 8-8 in FIG. 2.
Figure 15:
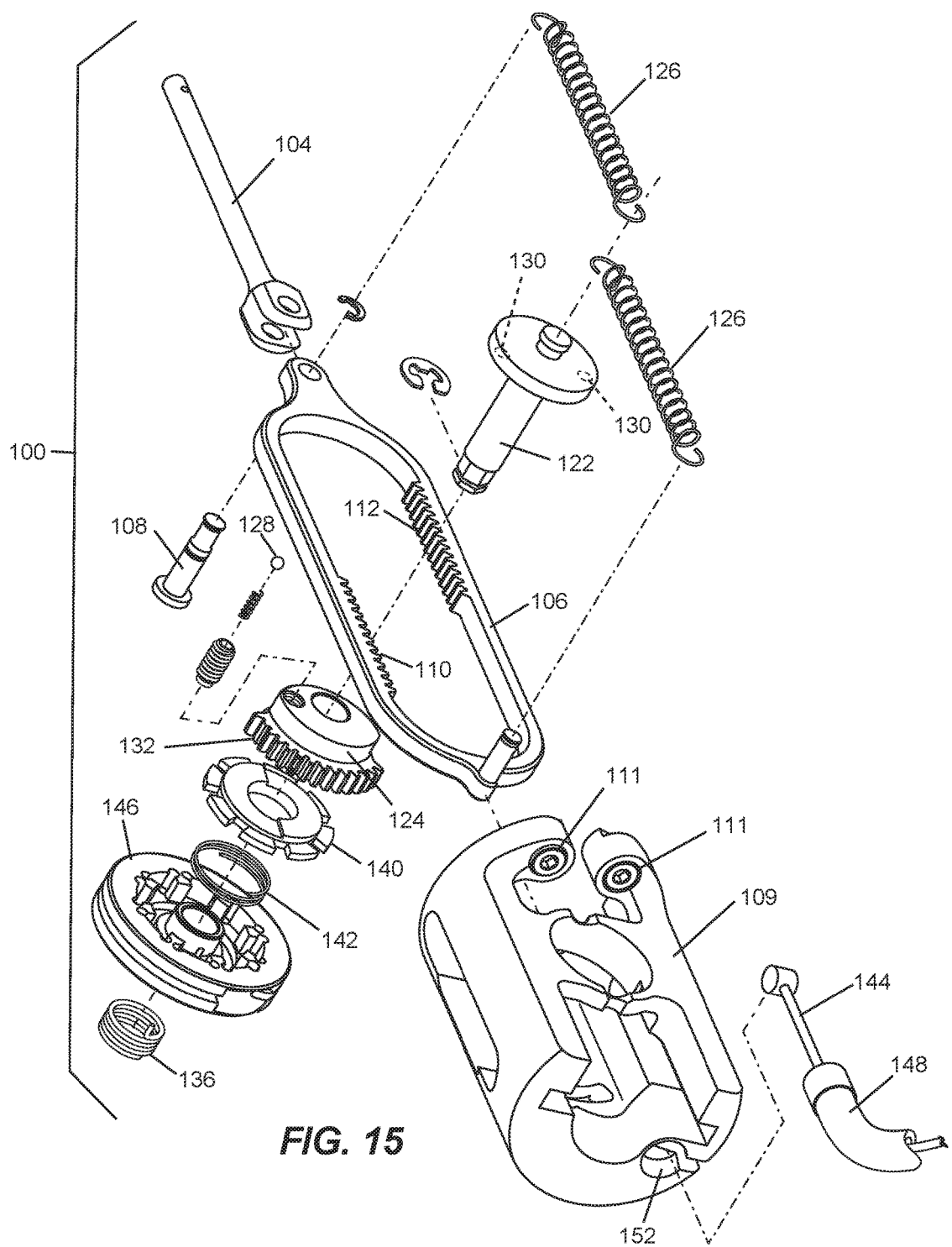
FIG. 15 is an exploded view of a drive system from the seat post assembly of FIG. 2.

The above-described movement of the actuating member 82 is accomplished by the drive system 100. The drive system 100 includes a reciprocating driver that is driven by a unidirectional rotor. The reciprocating driver includes a push rod 104 that drives the actuating member 82 through a pinned connection 105 (FIGS. 5 and 8), and a double-sided gear rack 106 that drives the push rod 104 through a pivotal connection having a drive pin 108. The illustrated gear rack 106 is an oval-shaped piece having an inner surface with a first row of teeth 110 on one side and a second row of teeth 112 on the opposing side. As shown in FIG. 15, each row of teeth 110,112 covers slightly less than half the overall length of the oval-shaped piece. The gear rack 106 is supported for reciprocating motion in a guide member 109 secured by two fasteners 111 to a lower end of the fixed support 54. In light of the connection between the gear rack 106, the push rod 104, and the actuating member 82, it can be seen that reciprocating movement (i.e., upward and downward) of the gear rack 106 will cause a corresponding reciprocating movement of the actuating member 82 to cause a raising and lowering of the upper tube 46, as described above.

The unidirectional rotor is mounted for rotation relative to the guide member 109 and provides reciprocating movement to the gear rack 106. The unidirectional rotor includes a rotor shaft 122 secured to the guide member 109, a half gear 124 mounted for rotation on the rotor shaft 122, and two rack return springs 126 coupled between the rotor shaft 122 and opposing ends of the gear rack 106. A detent mechanism provides two detent positions of the half gear 124 that are 180 degrees apart. In the illustrated embodiment, the detent mechanism includes a spring-biased ball 128 on the half gear 124 and two detents 130 on the rotor shaft 122.

Figure 17:
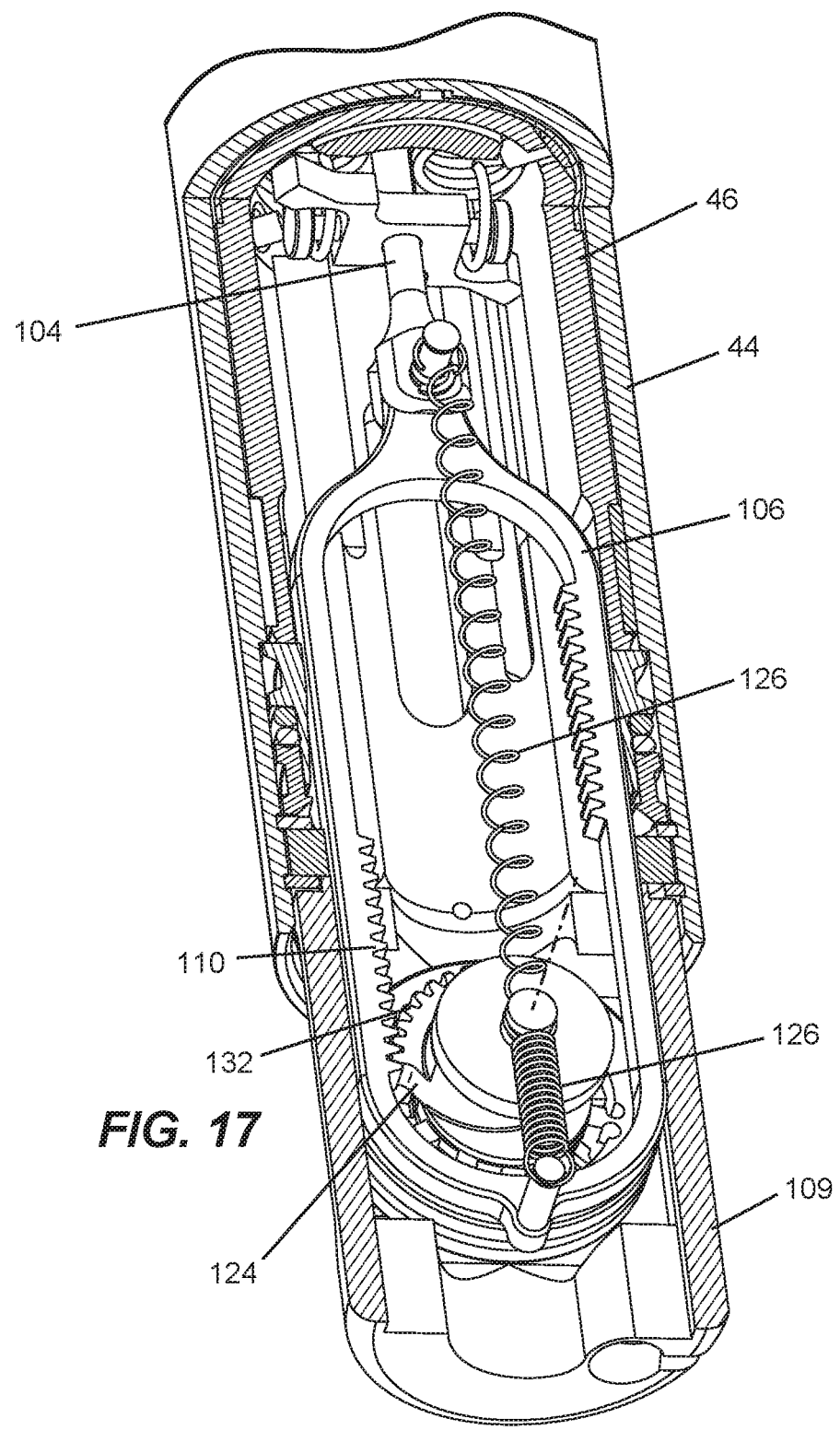
FIG. 17 is the section view of FIG. 16 with the drive system in an energize up position before triggering.
Figure 18:
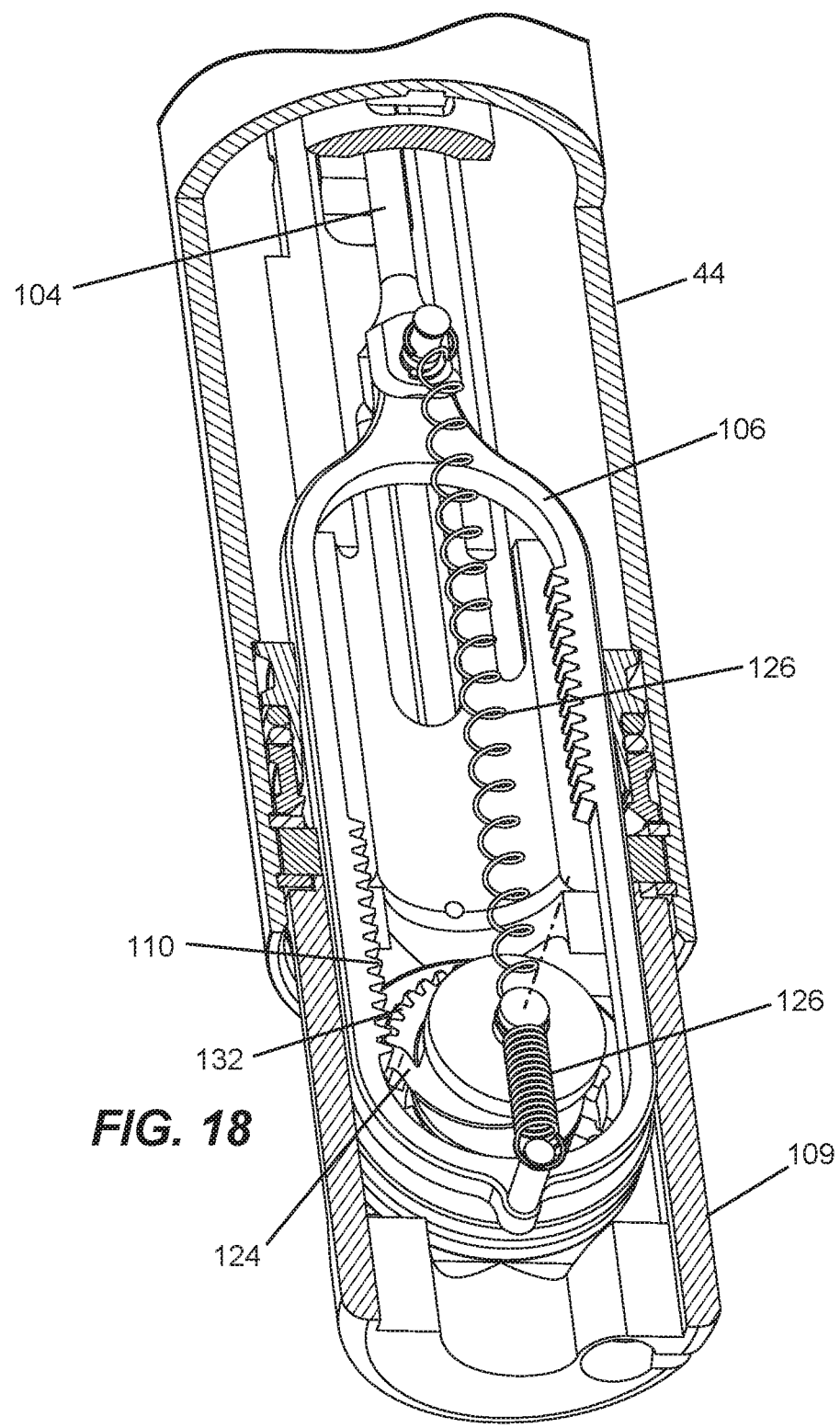
FIG. 18 is the section view of FIG. 17 with the seat post assembly in the raised position immediately after triggering.
Figure 19:
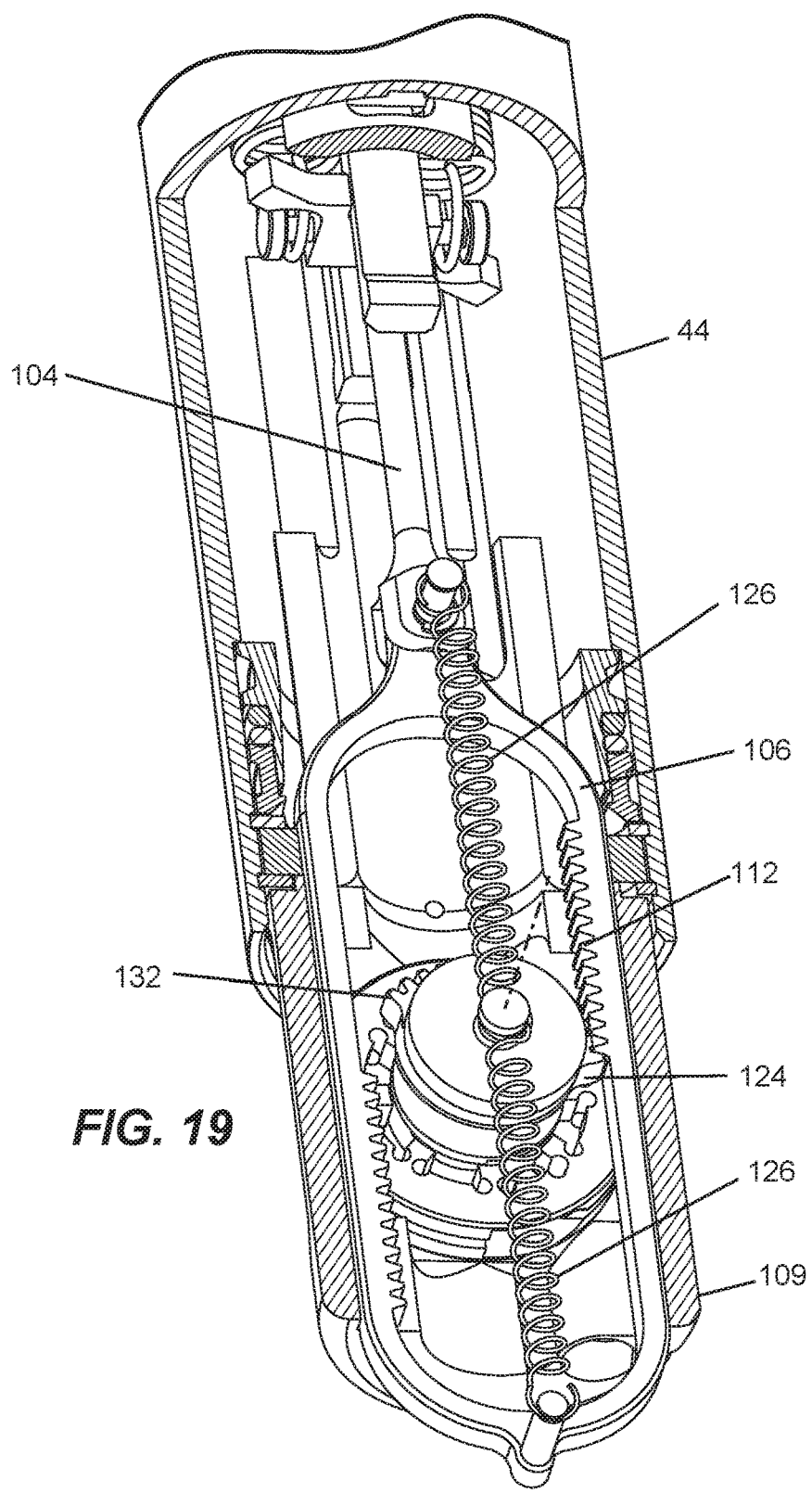
FIG. 19 is the section view of FIG. 18 with the seat post assembly in the raised position and the drive system reset to a neutral position.
Figure 20:
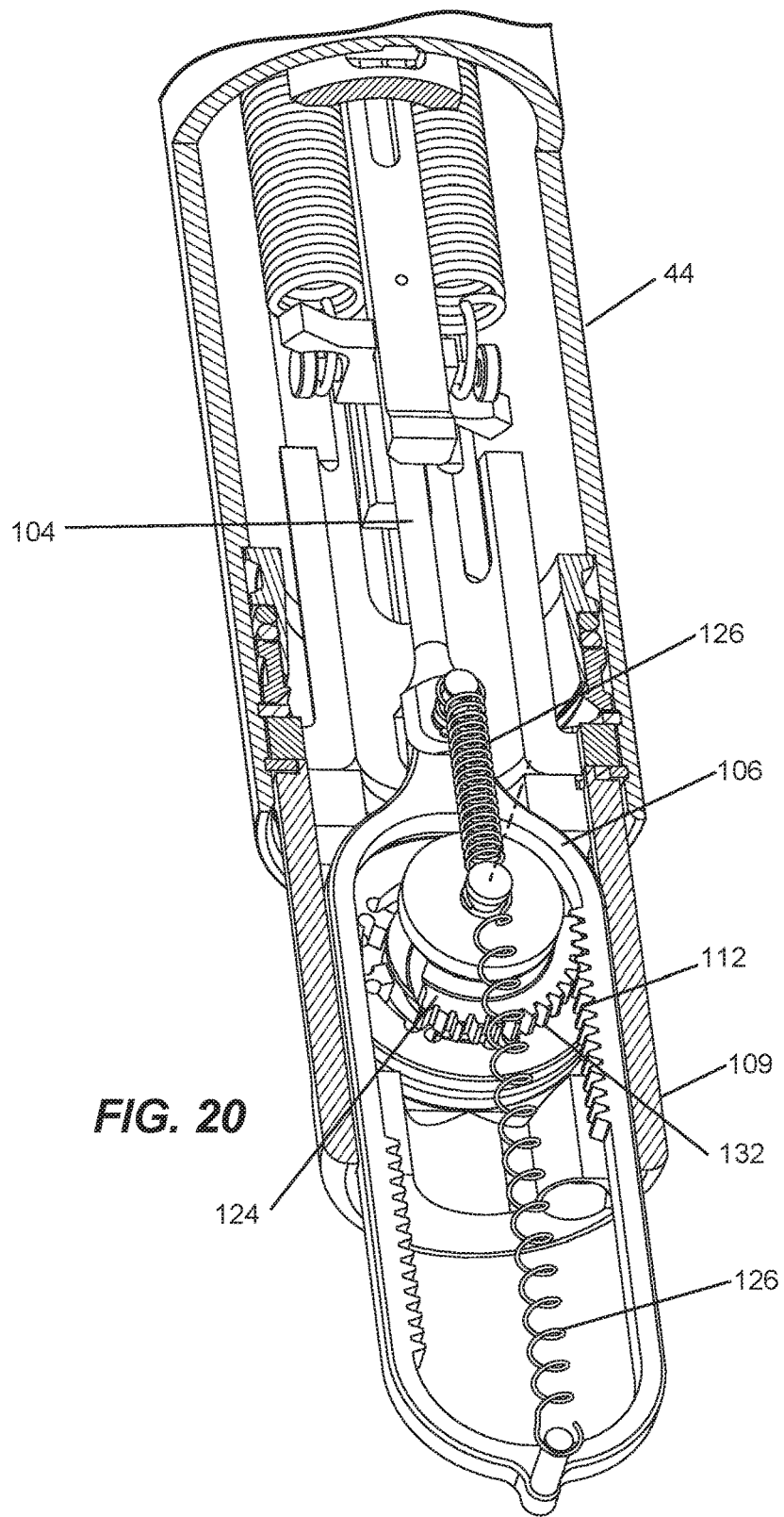
FIG. 20 is the section view of FIG. 19 with the drive system in the energize down position before triggering.
Figure 21:
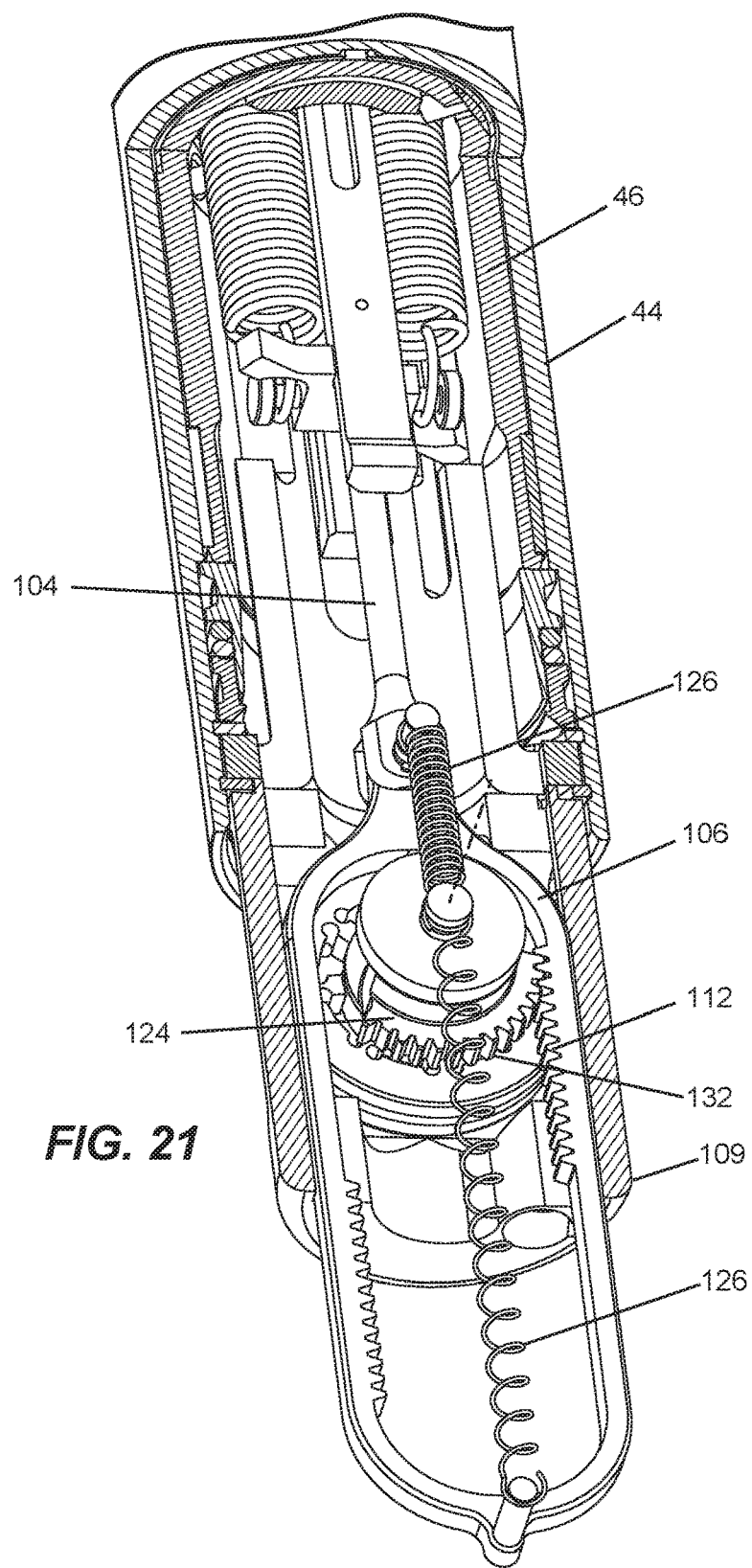
FIG. 21 is the section view of FIG. 20 with the seat post assembly in the lowered position immediately after triggering.

The half gear 124 includes gear teeth 132 that will alternatingly engage and drive the first row of teeth 110 and the second row of teeth 112. Referring to FIGS. 16-21, it can be seen that rotation of the half gear 124 in the clockwise direction (see arrow in FIG. 16) will cause movement of the gear rack 106 in the upward direction (FIGS. 17-18). After approximately 180 degrees of rotation, the gear teeth 132 will disengage the first row of teeth 110. The gear rack 106 will then return to a neutral position by virtue of the rack return springs 126 (FIG. 19). Continued rotation of the half gear 124 in the clockwise direction will cause movement of the gear rack 106 in the downward direction (FIGS. 20-21). After approximately 180 degrees of rotation, the gear teeth 132 will disengage the second row of teeth 112. The gear rack 106 will then return to a neutral position by virtue of the other rack return spring (back to FIG. 16), thus completing the cycle.

Referring back to FIG. 15, the half gear 124 is driven in the above-described unidirectional manner by a cable drum 134 mounted for rotation on the rotor shaft 122, a drum return spring 136 between the cable drum 134 and the guide member 109, and a one-way clutch between the cable drum 134 and the half gear 124. The one-way clutch includes a clutch member 140 and a clutch spring 142. The components are arranged such that a half turn of the cable drum 134 in the clockwise direction as viewed in FIG. 15 will drive the half gear 124 180 degrees (from one detent position to the other). If the cable drum 134 is then released, it will turn in the opposite direction to its starting position due to a biasing force provided by the drum return spring 136. When moving in this opposite direction, the clutch member 140 is freewheeling and thus does not cause movement of the half gear 124.

The cable drum 134 is driven by a cable member 144 partially wrapped around and having one end secured to the cable drum 134. In the illustrated embodiment, a portion of the cable member 144 resides in a cable groove 146 in the cable drum 134. These components are arranged such that pulling the cable member 144 will cause rotation of the cable drum 134 in the clockwise direction. When the cable member 144 is released, the drum return spring 136 will cause the cable drum 134 to pull the cable member 144 back and return to its starting position.

The illustrated cable member 144 slides within a cable housing 148 that guides the cable from the cable drum 134 to an actuating lever 150 on the handlebars. One end of the cable housing 148 is butted against a lower cable stop 152 formed into the guide member 109, and the other end of the cable housing 148 is butted against an upper cable stop (not shown) adjacent the actuating lever 150. The actuating lever 150 is movable from a retracted position, where the cable is not pulled, to an actuated position, where the cable is pulled sufficiently to rotate the cable drum 134 approximately 180 degrees. The actuating lever 150 is biased toward the retracted position by a return spring (not shown).

Figure 16:
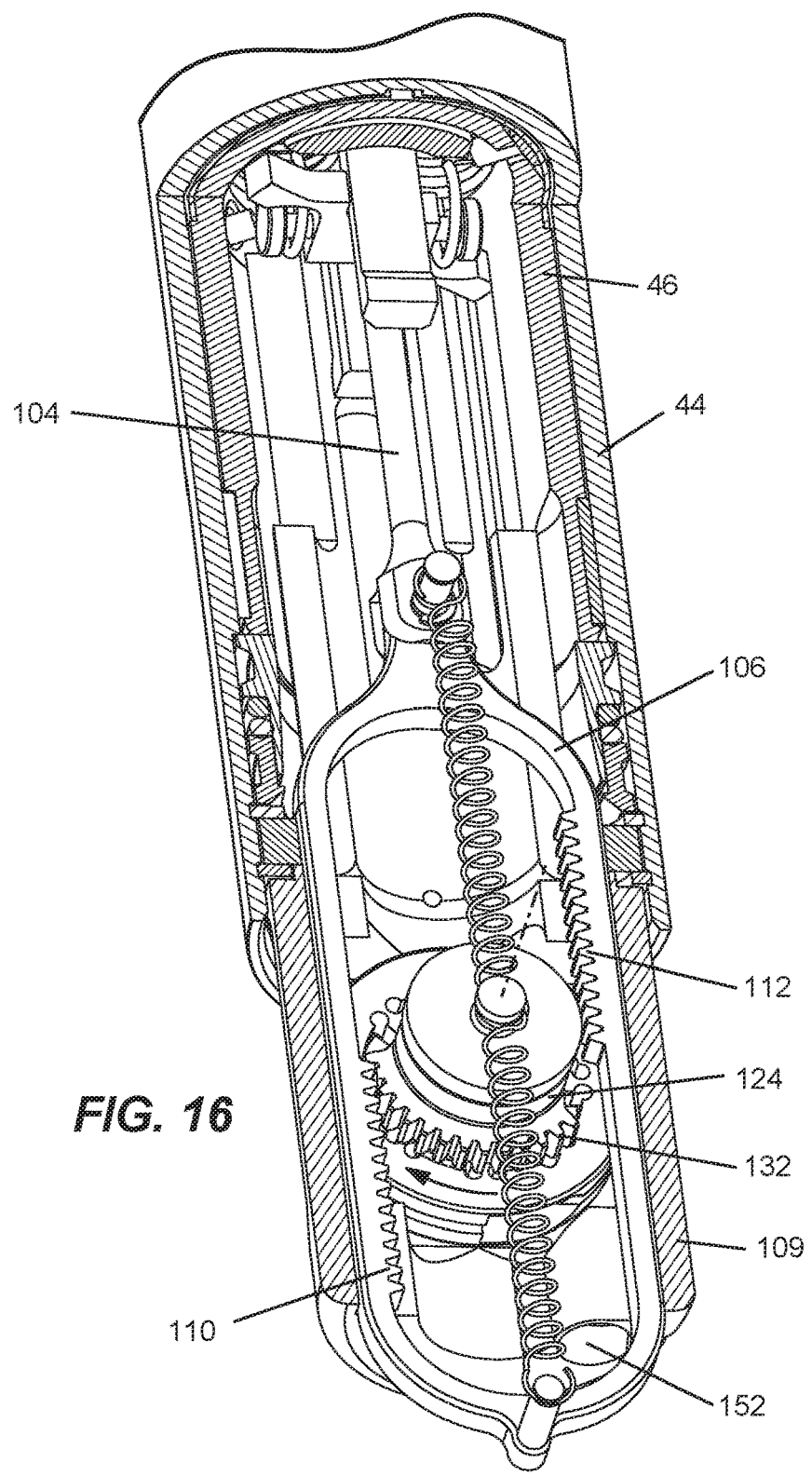
FIG. 16 is a section view taken along line 16-16 in FIG. 2 with the drive system in the neutral position and the seat post assembly in the lowered position.

The operation of the seat post assembly 42 will now be described starting with the upper tube 46 in the lowered position (FIGS. 5, 9, and 16). When it is desired to move the upper tube 46 to the raised position, the actuating lever 150 on the handlebars is moved from the retracted position to the actuated position, which causes the gear rack 106, push rod 104, and actuating member 82 to move upward (FIGS. 10 and 17). Such upward movement of the actuating member 82 pushes the upper follower 74 upward while the lower follower 76 is held in place, which causes the tensions springs to stretch and store energy. Eventually, the lower release cams will engage the lower pawls 58 (FIGS. 10 and 17).

Further upward movement of the actuating member 82 causes disengagement of the lower pawls 58 from the notch 62, which allows the upper tube 46 to be thrust upward under force from the tension springs 72. The energy provided by the tension springs 72 is sufficient to lift and launch the upper tube 46 upward until the upper pawls 56 engage the notch 62 (FIGS. 11 and 18).

Shortly after the upper tube 46 is raised, the gear teeth 132 will disengage the first row of teeth 110 of the gear rack 106, which causes the reciprocating driver to reset to a neutral position. This reset causes the push rod 104, the actuating member 82, and the followers 74,76 to move back to their neutral positions (FIGS. 6, 12, and 19). The actuating lever 150 on the handlebars can then be released and will be returned to the retracted position, which allows the cable drum 134 and clutch member 140 to rotate back to the starting position. In this configuration, the upper tube 46 is locked in the raised position, and the half gear 124 is positioned 180 degrees from its staring position (compare FIG. 19 to FIG. 16).

When it is desired to move the upper tube 46 to the lowered position, the actuating lever 150 on the handlebars is again moved from the retracted position to the actuated position, which causes the gear rack 106, push rod 104, and actuating member 82 to move downward (FIGS. 13 and 20). Such downward movement of the actuating member 82 pushes the lower follower 76 downward while the upper follower 74 is held in place, which causes the tension springs to stretch and store energy. Eventually, the upper release cams 92 will engage the upper pawls 56 (FIGS. 13 and 20).

Further downward movement of the actuating member 82 causes disengagement of the upper pawls 56 from the notch 62, which allows the upper tube 46 to be thrust downward under force from the tension springs 72. The energy provided by the tension springs 72 is sufficient to push and launch the upper tube 46 downward until the lower pawls 58 engage the notch 62 (FIGS. 14 and 21).

Shortly after the upper tube 46 is lowered, the gear teeth 132 will disengage the second row of teeth 112 of the gear rack 106, which causes the reciprocating driver to reset to a neutral position (FIGS. 5, 9 and 16). This reset causes the push rod 104, the actuating member 82, and the followers 74, 76 to move back to their neutral positions (FIGS. 5, 9, and 16). The actuating lever 150 on the handlebars can then be released and will return to the retracted position, which allows the cable drum 134 and clutch member 140 to rotate back to the starting position. In this configuration, the upper tube 46 is locked in the lowered position, and the half gear 124 is positioned back to its starting position (FIG. 16).

Various features and advantages of the invention are set forth in the following claims.

The invention claimed is:

1. A bicycle comprising:
   a front wheel and a rear wheel;
   a frame supported by the front wheel and the rear wheel;
   a seat; and
   a seat post assembly supported by the frame and supporting the seat, the seat post assembly including:
      a lower seat support secured to the frame;
      an upper seat support secured to the seat and selectively movable relative to the lower seat support;
      a locking mechanism configured to selectively (i) lock the seat post assembly to prevent the upper seat support from moving relative to the lower seat support and (ii) unlock the seat post assembly to permit the upper seat support to move relative to the lower seat support, wherein the locking mechanism includes a locking element that is configured to be moved (i) to engage the upper seat support to lock the seat post assembly and (ii) to disengage the upper seat support to unlock the seat post assembly; and
      an actuating mechanism to facilitate movement of the upper seat support relative to the lower seat support, the actuating mechanism comprising:
         a spring having a first node and a second node; and
         a drive system secured to the lower seat support, wherein the drive system includes a unidirectional rotor having a rotor shaft and a gear mounted on the rotor shaft, the drive system further including a reciprocating driver having a double-sided gear rack driven by the gear, wherein rotation of the unidirectional rotor is configured to drive the doubled-sided gear rack in a reciprocating manner to selectively move the first node and the second node away from each other to energize the spring, and wherein movement of the reciprocating driver is configured to move the locking element.

2. A bicycle as claimed in claim 1, wherein the upper seat support is telescopically positioned inside the lower seat support.

3. A bicycle as claimed in claim 1, wherein the locking element of the locking mechanism comprises a pawl adapted to selectively engage a notch in the upper seat support.

4. A bicycle as claimed in claim 1, wherein the spring comprises a coil spring.

5. A bicycle as claimed in claim 1, wherein the first node of the spring is secured to a first follower and the second node of the spring is secured to a second follower, and wherein the first follower is engageable with a first stop on the upper seat support to facilitate transfer of force from the spring to the upper seat support via the first follower and the first stop, and wherein the second follower is engageable with a second stop on the upper seat support to facilitate transfer of force from the spring to the upper seat support via the second follower and the second stop.

6. A bicycle as claimed in claim 1, wherein the reciprocating driver is movable from a neutral position in an upward direction and a downward direction.

7. A bicycle as claimed in claim 1, wherein the drive system further includes a first return spring coupled between the rotor shaft and a first end of the doubled-sided gear rack, and a second return spring coupled between the rotor shaft and a second end of the doubled-sided gear rack opposite the first end.

8. A bicycle as claimed in claim 1, wherein the gear is a half gear, wherein the double-sided gear rack includes a first row of teeth on one side of the double-sided gear rack and a second row of teeth on an opposite side of the double-sided gear rack, wherein the half gear is configured to engage the first row of teeth to move the double-sided gear rack upwardly, and is configured to engage the second row of teeth to move the double-sided gear rack downwardly, wherein the drive mechanism further includes a push rod coupled to the double-sided gear rack.

9. A bicycle as claimed in claim 1, wherein the drive system includes a lock release that is engageable with the locking element to move the locking element.

10. A bicycle as claimed in claim 1, further comprising a first follower and a second follower, and an actuating member positioned between the first follower and the second follower, wherein the first node of the spring is coupled to the first follower and the second node of the spring is coupled to the second follower, wherein the drive mechanism includes a push rod coupled to both the double-sided gear rack and to the actuating member, wherein reciprocating movement of the double-sided gear rack is configured to raise and lower the actuating member at different times, and to move the first and second followers apart from one another to energize the spring, and wherein a portion of the actuating member is configured to engage and move the locking element to unlock the upper seat support from the lower seat support.

11. A method of adjusting a height of a bicycle seat assembly including a lower seat support secured to a bicycle frame, an upper seat support that is selectively movable relative to the lower seat support between a lowered position and a raised position, a seat secured to the upper seat support, and a spring having a first node and a second node, the method comprising:
   locking the upper seat support in the lowered position relative to the lower seat support;

engaging the first node to the upper seat support;

moving the second node upward relative to the first node to energize the spring, wherein moving the second node upward includes rotating a unidirectional rotor having a rotor shaft and a gear mounted on the rotor shaft, wherein the gear is coupled to a double-sided gear rack such that rotating the unidirectional rotor raises the double-sided gear rack and moves the second node upward relative to the first node; and unlocking the upper seat support from the lowered position relative to the lower seat support, resulting in energy release from the spring and upward movement of the seat, wherein the moving the second node upward relative to the first node to energize the spring causes the unlocking the upper seat support from the lower seat support.

12. A method as claimed in claim 11, wherein the bicycle seat assembly further includes a pawl pivotally coupled to the lower seat support and a notch coupled to the upper seat support, and wherein locking the upper seat support in the lowered position relative to the lower seat support includes inserting the pawl into the notch.

13. A method as claimed in claim 12, wherein unlocking the upper seat support from the lowered position relative to the lower seat support includes removing the pawl from the notch.

14. A method as claimed in claim 11, wherein the first node and the second node are secured to a first node and a second follower, respectively, wherein the upper seat support includes the first stop and the second stop, and wherein engaging the first node to the upper seat support includes engaging the first follower with the first stop.

15. A method as claimed in claim 11, wherein the unidirectional rotor and the double-sided gear rack are part of a drive system secured to the lower seat support, wherein the drive system further includes two return springs coupled between the rotor shaft and opposing ends of the doubled-sided gear rack, and wherein the method further includes rotating the unidirectional rotor to energize the two return springs.

16. A method as claimed in claim 15, wherein the gear is a half gear, wherein the double-sided gear rack includes a first row of teeth on one side of the double-sided gear rack and a second row of teeth on an opposite side of the double-sided gear rack, wherein the method further includes engaging the half gear with the first row of teeth to move the double-sided gear rack upwardly to energize one of the return springs, and engaging the half gear with the second row of teeth to move the double-sided gear rack downwardly and engage the other return spring.

17. A method as claimed in claim 11, wherein the bicycle seat assembly further includes a locking mechanism for selectively locking and unlocking the position of the upper seat support relative to the lower seat support, wherein the drive system includes a lock release, and wherein unlocking the upper seat support from the lowered position relative to the lower seat support includes engaging the lock release with the locking mechanism.

18. A method as claimed in claim 11, further comprising:
locking the upper seat support in the raised position relative to the lower seat support;
engaging the second node to the upper seat support;
moving the first node downward relative to the second node to energize the spring;
unlocking the upper seat support from the raised position relative to the lower seat support, resulting in energy release from the spring and downward movement of the seat, wherein the moving the first node downward relative to the second node causes the unlocking the upper seat support from the raised position relative to the lower seat support.

* * * * *